(12) United States Patent
Hunt et al.

(10) Patent No.: US 9,392,094 B2
(45) Date of Patent: Jul. 12, 2016

(54) MOBILE ELECTRONIC WEARABLE DEVICE AND METHOD FOR PROVIDING HAPTIC NOTIFICATION

(71) Applicant: SONY CORPORATION, Tokyo (JP)

(72) Inventors: Alexander Hunt, Tygelsjo (SE); Magnus Johansson, Dosjebro (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/359,851

(22) PCT Filed: Jan. 15, 2014

(86) PCT No.: PCT/IB2014/058274
§ 371 (c)(1),
(2) Date: May 21, 2014

(87) PCT Pub. No.: WO2015/107386
PCT Pub. Date: Jul. 23, 2015

(65) Prior Publication Data
US 2015/0207914 A1    Jul. 23, 2015

(51) Int. Cl.
| | | |
|---|---|---|
| G08B 21/00 | (2006.01) | |
| H04M 1/725 | (2006.01) | |
| G08B 6/00 | (2006.01) | |
| G06F 3/01 | (2006.01) | |
| H04B 1/3827 | (2015.01) | |
| G06F 1/16 | (2006.01) | |
| H04M 19/04 | (2006.01) | |

(52) U.S. Cl.
CPC .......... *H04M 1/72519* (2013.01); *G06F 1/163* (2013.01); *G06F 3/016* (2013.01); *G08B 6/00* (2013.01); *H04B 1/385* (2013.01); *H04M 1/72597* (2013.01); *H04M 19/047* (2013.01); *H04B 2001/3855* (2013.01); *H04B 2001/3861* (2013.01); *H04M 1/7253* (2013.01)

(58) Field of Classification Search
CPC ............................. H04M 1/2519; G08B 6/00
USPC .............................. 340/407.1, 407.2; 428/220
See application file for complete search history.

(56) References Cited

U.S. PATENT DOCUMENTS

| | | |
|---|---|---|
| 2012/0128960 A1 | 5/2012 | Busgen et al. |
| 2013/0063256 A1 | 3/2013 | Tartz et al. |
| 2013/0262298 A1 | 10/2013 | Morley |

FOREIGN PATENT DOCUMENTS

EP    2677395 A1    12/2013

OTHER PUBLICATIONS

International Search Report and Written Opinion dated Apr. 23, 2014, issued in corresponding PCT Application No. PCT/IB2014/058274, 9 pages.

*Primary Examiner* — Jeffrey Hofsass
(74) *Attorney, Agent, or Firm* — Tucker Ellis LLP; M. David Galin (57) ABSTRACT

A mobile electronic wearable device (1), adapted to be worn by a user, comprising means for providing 10 haptic notifications to a user and a method for providing haptic notifications on mobile electronic wearable devices (1).

20 Claims, 4 Drawing Sheets

MOBILE ELECTRONIC WEARABLE DEVICE AND METHOD FOR PROVIDING HAPTIC NOTIFICATION

TECHNICAL FIELD

The present invention relates to a mobile electronic wearable device and to a method for providing haptic notifications on mobile electronic wearable devices.

BACKGROUND ART

Users of mobile electronic devices are today and in the near future more and more relying on notifications from mobile electronic wearable devices, e.g. watches, wrist bands, components integrated into clothes, necklaces etc, for delivering information to the user. The wearable device gradually performs more and more interaction with the user, and also allows the user to interact with mobile electronic devices connected to the wearable device. In prior art, notifications to the user from the wearable device is generally performed by emitting sound signals, light signals or vibrations. Use of sound signals and light signals for notification may be the most effective way to make a user aware of an occurring event but it is under some circumstances not a preferred method for notifying the user, e.g. when the user is in a meeting or other environment in which such signals may disturb other people in the immediate surroundings.

To enable discrete notifications from the wearable device, the user can choose vibrations as notification method. However, having to incorporate an arrangement for delivering vibrations in a wearable device generally makes it bulky, heavy and the variation of the notifications that can be delivered by vibrations is limited.

There is therefore a need for a mobile electronic wearable device provided with means for providing haptic notifications to a user and a method for providing haptic notifications on mobile electronic wearable devices without adding unnecessary weight to the mobile electronic wearable device and that enables haptic notifications that are distinctly separable from one another.

SUMMARY OF THE INVENTION

With the above description in mind, then, an object of the present disclosure is to provide a mobile electronic wearable device that comprises means for providing haptic notifications to a user wearing the mobile electronic wearable device and a method for providing haptic notifications on a mobile electronic wearable device, which seeks to mitigate, alleviate, or eliminate one or more of the above-identified deficiencies in the art and disadvantages singly or in any combination.

These and further objects are achieved by a mobile electronic wearable device, that is adapted to be worn by a user and which mobile electronic wearable device comprises:
- an electroactive polymer film applied to a portion of the mobile electronic wearable device such that, when the electronic wearable device is worn by a user, the electroactive polymer film is positioned facing the skin of a user. The electroactive polymer film comprises at least one deformable segment that is configured to deform by the application of a voltage over the electroactive polymer film such that the at least one deformable segment protrudes towards the user and thereby applies a pressure against the skin of the user, and
- a control unit being configured to control the voltage applied over at least one deformable segment on the electroactive polymer film thereby delivering a haptic notification to a user.

By providing a mobile electronic wearable device which comprises a electroactive polymer film, arranged to deform such that is presses against the skin of a user of the mobile electronic wearable device, and a control unit adapted to control the voltage, thereby controlling the deformation of the deformable segments in said electroactive film, the mobile electronic wearable device can be made lighter and smaller while achieving more versatile and efficient haptic notifications than prior art. The notifications, i.e. deformations of the at least one deformable segment, may be varied to a great extent, enabling the mobile electronic wearable device to notify the user in a haptic way such that the user easily can tell one haptic notification from the other.

According to another aspect of the invention a mobile electronic wearable device is provided, wherein the mobile electronic wearable device further comprises a wireless transceiver adapted to receive and transmit wireless signals and wherein the control unit is adapted to control the voltage based on information obtained over the wireless interface. An advantage of the above aspect is that the haptic notifications delivered to the user of the mobile electronic wearable device may be based on information transmitted to the mobile electronic wearable device from another electronic device wirelessly, for instance from a computer, a from a mobile electronic device, GPS-signals etc.

According to another aspect of the invention a mobile electronic wearable device is provided, wherein the mobile electronic wearable device further comprises a wireless Bluetooth transceiver adapted to communicate wirelessly using Bluetooth, Bluetooth low energy or therewith compatible protocols.

According to yet another aspect of the invention a mobile electronic wearable device is provided, wherein the wireless transceiver is adapted to receive wireless signals comprising notification information from a mobile electronic device, the notification information being indicative of the mobile electronic device receiving any of a SMS, an MMS, a phone call, email, social media update, software update, GPS-navigation instructions, or similar information. By providing the mobile electronic wearable device with wireless signals indicating that a mobile electronic device, connected wirelessly to the mobile electronic wearable device, has received information according to the above or any other type of update that may be of importance to a user, the mobile electronic wearable device may notify the user with a notification depending on the type of information that the mobile electronic device has received.

According to yet another aspect of the invention a mobile electronic wearable device is provided, wherein the control unit is adapted to control the voltage that is provided to the at least one deformable segment in response to output from an internal software application running on the mobile electronic wearable device. By allowing the control unit to control the voltage to the at least one deformable segment based on output from an internal software application running on the mobile electronic wearable device, the haptic notifications may be delivered to the user without external signals being received by the mobile electronic wearable device. For instance, an internal application may be indicating that the mobile electronic wearable device is low in battery, prompting an output to the control unit to apply a voltage to the at least one deformable segment and thereby notify the user.

According to yet another aspect of the invention a mobile electronic wearable device is provided, wherein the mobile electronic wearable device is configured to be worn on the wrist.

According to yet another aspect of the invention a mobile electronic wearable device is provided, wherein the at least one deformable segment is deformable such that it protrudes outwards away from the surrounding surface of the mobile electronic wearable device when the voltage is applied and thereby presses against the skin of the user. By providing the mobile electronic wearable device with a deformable segment in the electroactive polymer film that is deformable such that it presses against the skin of a user, the user may be notified with a large variation of arbitrary haptic signals such as the deformable segment simply "tapping" on the skin of the user or maintaining a pressure over a predetermined time etc.

According to yet another aspect of the invention a mobile electronic wearable device is provided, wherein the electroactive polymer film has a thickness in the range of 0.2-1.5 mm, preferably in the range 0.5- to 1.0 mm. By providing a electroactive polymer film with a thickness in the range of 0.2-1.5 mm, preferably in the range of 0.5-1.0 mm, a sufficient amount of protrusion is achievable when the voltage is applied to deform the at least one deformable segment. This ensures that a user of the mobile electronic wearable device may distinctly feel the notification.

According to yet another aspect of the invention a mobile electronic wearable device is provided, wherein the at least one deformable segment has an essentially circular outline.

According to yet another aspect of the invention a mobile electronic wearable device is provided, wherein the at least one deformable segment has a size in the range of 3-20 mm, preferably in the range of 5-10 mm. By providing at least one deformable segment with a size, as measured across the segment from one side to the other, in the range of 3-20 mm, preferably in the range of 5-10 mm, the size and quantity of deformable segments can be optimized while maintaining a high detectability of the notifications delivered by the deformable segments.

According to yet another aspect of the invention a mobile electronic wearable device is provided, wherein the mobile electronic wearable device comprises two deformable segments which deformations are individually controllable by the control unit. By the mobile electronic wearable device comprising two deformable segments individually controllable by the control unit, the amount of variations of the notifications is doubled. The mobile electronic wearable device may comprise further deformable segments which would further increase the amount of possible notifications without having to add heavy hardware components.

The above and further objects are also achieved by a method, performed in a mobile electronic wearable device, for providing haptic notifications on mobile electronic wearable devices. The mobile electronic wearable device comprises an electroactive polymer film applied to a portion of the mobile electronic wearable device such that, when the electronic wearable device is worn by a user, the electroactive polymer film is positioned facing the skin of a user. The electroactive polymer film comprises at least one deformable segment, wherein the method comprises the steps of:
- obtaining information for provision to a user wearing the mobile electronic wearable device, and
- controlling, by means of a control unit, a voltage to the at least one deformable segment in response to the obtained information, thereby deforming said at least one deformable segment by means of the provided voltage in order to deliver a haptic notification to a user by the at least one deformable segment deforming outwards towards the skin of a user and thereby applying pressure against the skin of the user based on the obtained information. By presenting a method for providing haptic notifications on mobile electronic wearable devices, a way of delivering versatile and efficient haptic notifications is achieved. The notifications, i.e. deformations of the at least one deformable segment, may be varied to a great extent depending on the obtained information, enabling the mobile electronic wearable device to notify the user in a haptic way such that the user easily can tell one haptic notification from another.

According to yet another aspect of the invention a method for providing haptic notifications on mobile electronic wearable devices is provided, wherein the obtained information may be received over a wireless interface by means of a wireless transceiver. An advantage of the above aspect is that the haptic notifications delivered to the user of the mobile electronic wearable device may be based on information transmitted to the mobile electronic wearable device from another electronic device wirelessly, for instance from a computer, from a mobile electronic device, GPS-signals etc.

According to yet another aspect of the invention a method for providing haptic notifications on mobile electronic wearable devices is provided, wherein the obtained information may be received over a wireless Bluetooth interface by means of a wireless Bluetooth transceiver and/or a wireless Bluetooth low energy transceiver.

According to a further aspect of the invention a method for providing haptic notifications on mobile electronic wearable devices is provided, wherein the obtained information may be output from an internal software application running on the mobile electronic wearable device. By allowing the control unit to control the voltage to the at least one deformable segment based on obtained information being output from an internal software application running on the mobile electronic wearable device, the haptic notifications may be delivered to the user without external signals being received by the mobile electronic wearable device. For instance, an internal application may be indicating that the mobile electronic wearable device is low in battery, prompting an output to the control unit to apply a voltage to the at least one deformable segment and thereby notify the user.

According to a further aspect of the invention a method for providing haptic notifications on mobile electronic wearable devices is provided, wherein the deformation of the at least one deformable segment is controlled by the control unit controlling, for each deformable segment individually, the voltage and/or polarity of voltage and/or length of application of voltage and/or rate of voltage pulsation based on the obtained information. By controlling the voltage and/or polarity of voltage and/or length of application of voltage and/or rate of voltage pulsation based on the obtained information, the notifications, i.e. the deformation of the at least one deformable segment, may be varied in a large number of ways providing distinctly different notifications which the user easily can identify.

According to a further aspect of the invention a method for providing haptic notifications on mobile electronic wearable devices is provided, wherein the voltage is controlled in response to information obtained over the wireless interface, the signals being transmitted from a mobile electronic device and being indicative of the mobile electronic device receiving any of a SMS, an MMS, a phone call, email, social media update, software update, GPS-navigation, or similar information that may be notified to the user of the mobile electronic wearable device. By controlling the voltage in response to wireless signals indicating that a mobile electronic device, connected wirelessly to the mobile electronic wearable device, has received information according to the above or any other type of update that may be of importance to a user, the mobile electronic wearable device may notify the user with a notification depending on the type of information that the mobile electronic device has received.

According to another object of the disclosure, a mobile electronic device is provided comprising a wireless communication interface and being configured to transmit information, using the wireless interface, to a mobile electronic wearable device according to the invention, thereby enabling the mobile electronic wearable device to provide haptic notifications, based on the received information, to a user. By providing a mobile electronic device configured to wirelessly transmit information to the mobile electronic wearable device, the mobile electronic wearable device may notify the user of events occurring in the mobile electronic device.

BRIEF DESCRIPTION OF THE DRAWINGS

The present technique will be more readily understood through the study of the following detailed description of the embodiments/aspects together with the accompanying drawings, of which.

It should be added that the following description of the embodiments is for illustration purposes only and should not be interpreted as limiting the disclosure exclusively to these embodiments/aspects.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Embodiments of the present invention will be exemplified using a mobile electronic wearable device such as a watch. However, it should be appreciated that the invention is as such equally applicable to other mobile electronic wearable devices. Examples of such devices may for instance be any type of wrist bands, components integrated into clothes, necklaces, etc.

Figure 1:
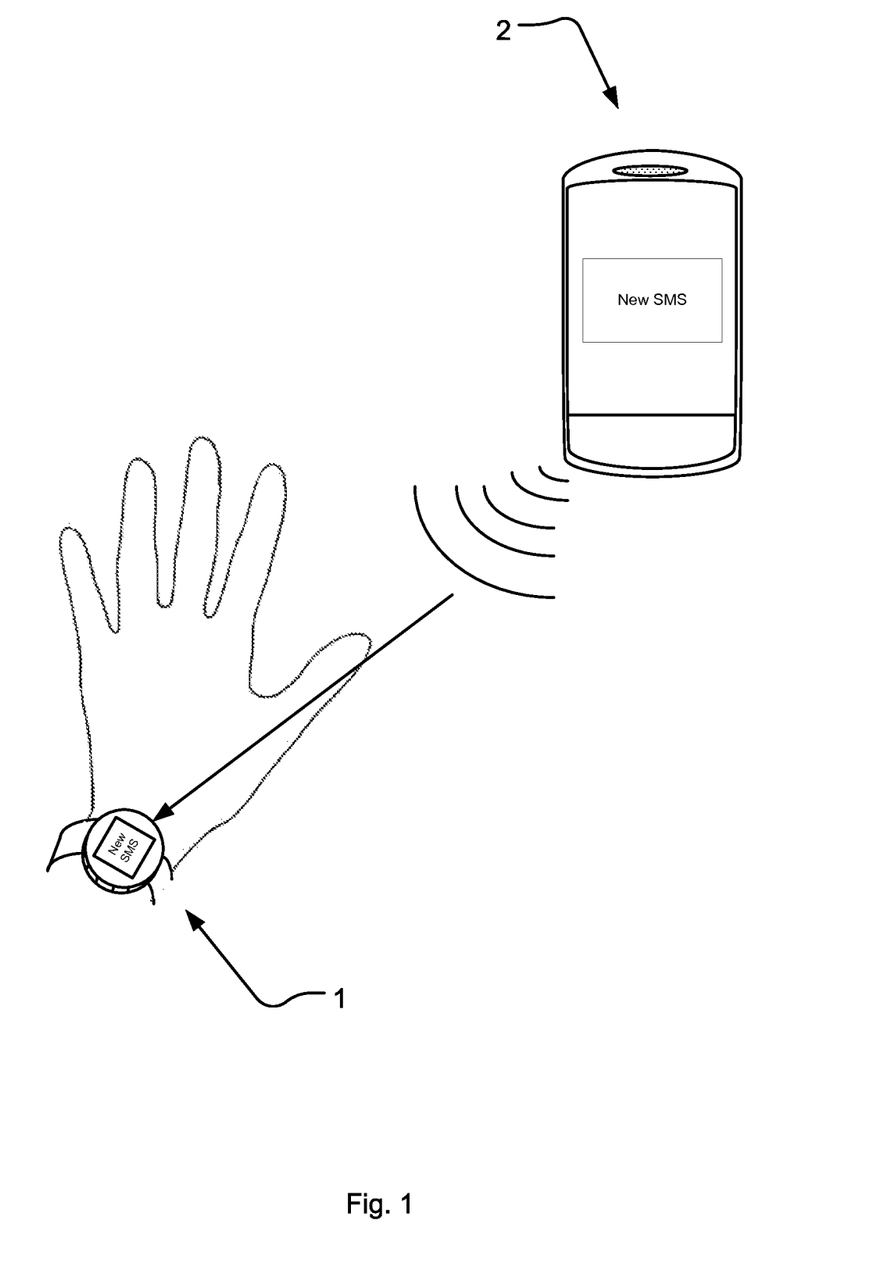
FIG. 1 illustrates an overview of an exemplary set up according to the present invention.

FIG. 1 illustrates an overview of an exemplary set up according to the present invention. The set up includes a mobile electronic wearable device 1 according to one embodiment of the invention, which mobile electronic wearable device is adapted to be worn by a user. For instance, it may be worn as a watch, as illustrated in the exemplary set up, however it is to be understood that it may be embodied in the shape of a wrist band, or incorporated into clothing, necklaces or similar items. The exemplary set up further illustrates a mobile electronic device 2, which comprises a wireless communication interface and being configured to transmit information, in this exemplary case information indicating that the mobile electronic device 2 have received an SMS, using the wireless interface, to the mobile electronic wearable device 1. The information transmitted from the mobile electronic device 2 may be indicating that the mobile electronic device 2 has received any of a SMS, an MMS, a phone call, email, social media update, software update, GPS-navigation, or similar information that might be of value to the user of the mobile electronic device and the mobile electronic wearable device.

In FIG. 1, the mobile electronic device 2 is illustrated as a mobile phone, however it should be appreciated that it is as such equally applicable to other electronic devices. Examples of such devices may for instance be any type of laptop (such as standard, ultra portables, netbooks, and micro laptops) handheld computers, portable digital assistants, tablet computers, gaming devices, accessories to mobile phones, etc. Furthermore, a plurality of mobile electronic devices 2 may be transmitting information to the mobile electronic wearable device 1 simultaneously, enabling the wearable device 1 to notify the user of events in several mobile electronic devices 2 at essentially the same time or subsequently. The mobile electronic wearable device 1 is thereby enabled to provide haptic notifications, based on the received information from the mobile electronic device 2, to a user. The user of the mobile electronic wearable device 1 may be the same person as the user of the mobile electronic device 2, however they may also be different persons depending on the situation and application of the invention. For instance, the mobile electronic wearable device 1 may be set to notify the user of the wearable device 1 when a wireless signal from another mobile electronic device 2 is detected to simply notify the user of the wearable device 1 of the presence of a mobile electronic device 2.

Figure 2:
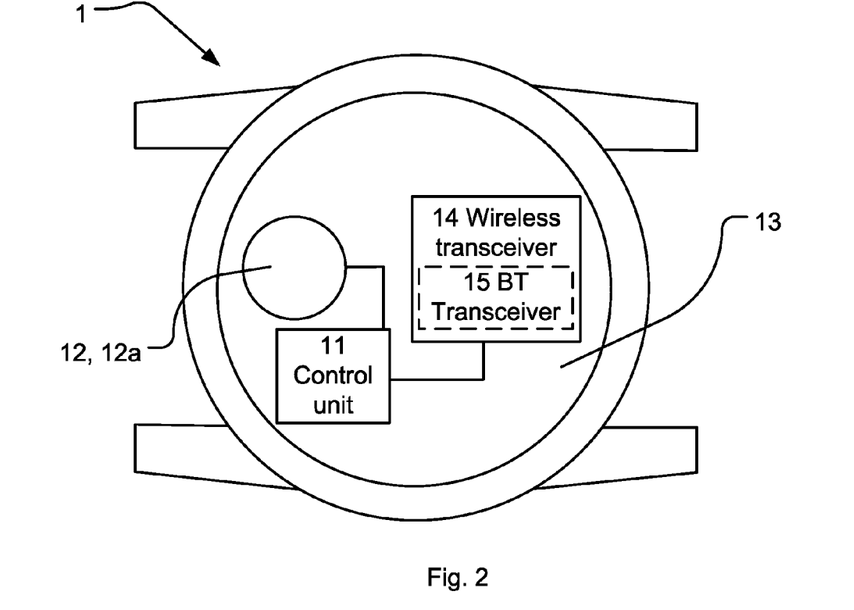
FIG. 2 illustrates a rear/underside view of a mobile electronic wearable device according to one embodiment of the present invention.

Turning to FIG. 2, which illustrates a rear/underside view of a mobile electronic wearable device according to one embodiment of the present invention. The mobile electronic wearable device 1 comprises an electroactive polymer film 12 applied to a portion 13 of the mobile electronic wearable device 1 such that, when the electronic wearable device is worn by a user, the electroactive polymer film 12 is positioned facing the skin of a user.

The electroactive polymer may be e.g. a ionic electroactive polymer which comprises five layers, top and bottom being encapsulation, layer 2 and 4 is anode and cathode, which may be switchable, and in the middle the polymer. The electroactive polymer film may further comprise conjugated polymers used as actuator materials e.g. Polypyrrole(PPy), Polythiophene(PT), Polyethylenedioxythiophene (PEDOT) etc. Furthermore, the electroactive polymer film 12 may comprise at least one deformable segment 12a, 12b that is configured to deform such that the at least one deformable segment protrudes towards the skin of the user, outwards from the surrounding surface i.e. portion 13 of the mobile electronic wearable device 1 and thereby applies a pressure against the skin of the user. The at least one deformable segment 12a, 12b is illustrated as being of a circular shape roughly 5-10 mm in diameter, which generates a specific protruding shape when deformed that results a certain sensation when pressed against the skin of the user. The outline of the deformable segment 12a, 12b may be any other shape and size, for instance the deformable segment(s) 12a, 12b may be shaped as an ellipse providing a different sensation for the user than that of a circular deformable segment. However a size of each deformable segment in the range of 3 to 20 mm, preferably in the range of 5 to 10 mm as measured across, from one side to the other when seen from above, is beneficial in the optimization of the usage of surface area for each deformable segment and/in relation to the detectability of the notifications delivered by each deformable segment 12a, 12b on the mobile electronic wearable device 1.

The thickness of the electroactive polymer film 12 may be in the range of 0.2 to 1.5 mm while a thickness in the range of 0.5-1 mm is preferred. This would allow a protrusion of each deformed deformable segment in the range of 2-4 mm which ensures that the protruding deformable segments 12a, 12b are distinctly felt by the user of the mobile electronic wearable device 1.

The mobile electronic wearable device further comprises a control unit 11 being configured to control the voltage applied over at least one deformable segment 12a, 12b on the electroactive polymer film 12 thereby delivering a haptic notification to a user. The control unit 11, or processing circuitry 11 may be constituted by any suitable Central Processing Unit, CPU, microcontroller, Digital Signal Processor, DSP, etc. capable of executing computer program code. The software applications may be stored in a memory. The memory can be any combination of a Read And write Memory, RAM, and a Read Only Memory, ROM. The memory may also comprise persistent storage, which, for example, can be any single one or combination of magnetic memory, optical memory, or solid state memory or even remotely mounted memory.

The deformation occurs when a voltage is applied over the electroactive polymer film 12, and as long as the voltage is applied the deformable segment 12a, 12b stays deformed. The polarity of the voltage determines the direction of the deformation and to achieve a higher speed of the restoring of the deformable segment 12a, 12b to a non deformed state, the polarity may be switched.

In order to communicate wirelessly, the mobile electronic wearable device 1 further comprises a wireless transceiver 14 adapted to receive and transmit wireless signals and wherein the control unit 11 is adapted to control the voltage based on information obtained over the wireless interface. The wireless transceiver 14 enables communication with electronic devices or mobile electronic devices that comprises means for wireless communication and that is within range of the mobile electronic wearable device 1. By the mobile electronic wearable device being configured to receive information over a wireless interface and the control unit 11 controlling the voltage in response to said received information, the mobile electronic wearable device 1 may essentially function as an extension of the device transmitting information, notifying the user of the mobile electronic wearable device 1 in response to said information.

The wireless transceiver may further be comprising a wireless Bluetooth transceiver 15 adapted to communicate wirelessly using Bluetooth, Bluetooth low energy or therewith compatible protocols. This enables an electronic or mobile electronic device that comprises a Bluetooth transceiver to be connected to the mobile electronic wearable device 1 and thereby transmit information that can be notified to the user of the mobile electronic wearable device 1.

The control unit 11 may further be adapted to be controlling the voltage that is provided to the at least one deformable segment 12a, 12b in response to output from an internal software application running on the mobile electronic wearable device 1. Since the mobile electronic wearable device may be an independent device, not relying on other electronic devices for receiving information that should be notified to a user, the mobile electronic wearable device is adapted to generate output from a software application, which is stored in the wearable device 1 and executed by the control unit 11. The output from the software application is recognized by the control unit 11 which in turn applies a suitable voltage to one or several deformable segments 12a, 12b that deforms and notifies the user.

Figure 3:
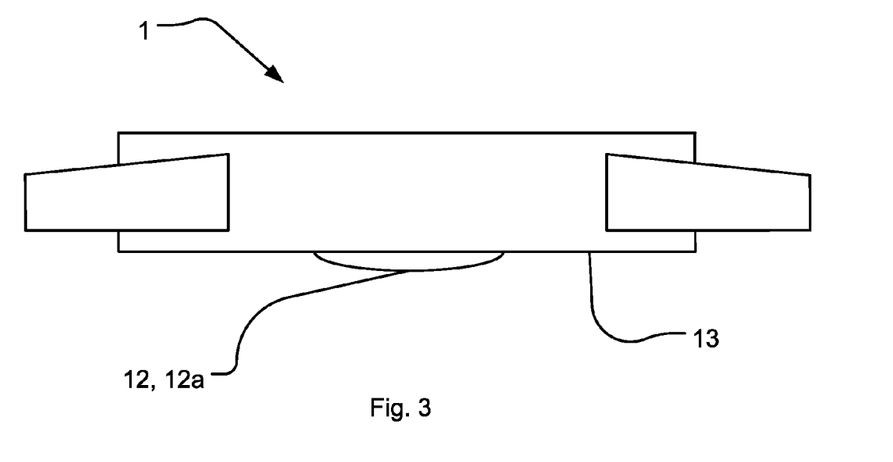
FIG. 3 illustrates a side view of a mobile electronic wearable device according to one embodiment of the present invention.

FIG. 3 illustrates a side view of a mobile electronic wearable 1 device according to one embodiment of the present invention showing a deformable segment 12a in its deformed state. The bottom portion 13 is designed to function as a surface which rests against the skin of a user when the mobile electronic wearable device 1 is worn. The at least one deformable segment 12a, 12b is deformable such that it protrudes outwards away from the surrounding surface, i.e. in this case bottom portion 13, of the mobile electronic wearable device 1 when the voltage is applied and thereby presses against the skin of the user.

Figure 4:
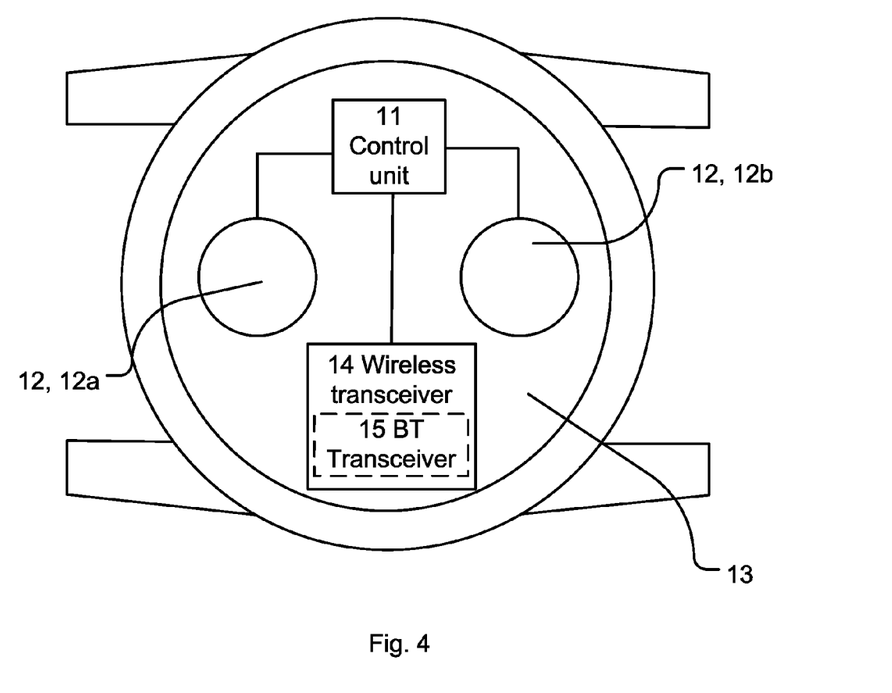
FIG. 4 illustrates a rear/underside view of a mobile electronic wearable device according to one embodiment of the present invention.

FIG. 4 illustrates a rear/underside view of a mobile electronic wearable device according to one embodiment of the present invention in which the mobile electronic wearable device 1 comprises two deformable segments 12a, 12b which deformations are individually controllable by the control unit 11. The control unit 11 controls each deformable segment by applying a current in response to obtained information from either a wireless interface, i.e. the wireless transceiver 14, or from software applications running on the mobile electronic wearable device 1. The present invention is however not limited to one or two deformable segments, it should be considered that the mobile electronic wearable device may comprise a plurality of deformable segments, each being individually controllable by the control unit 11.

Figure 5:
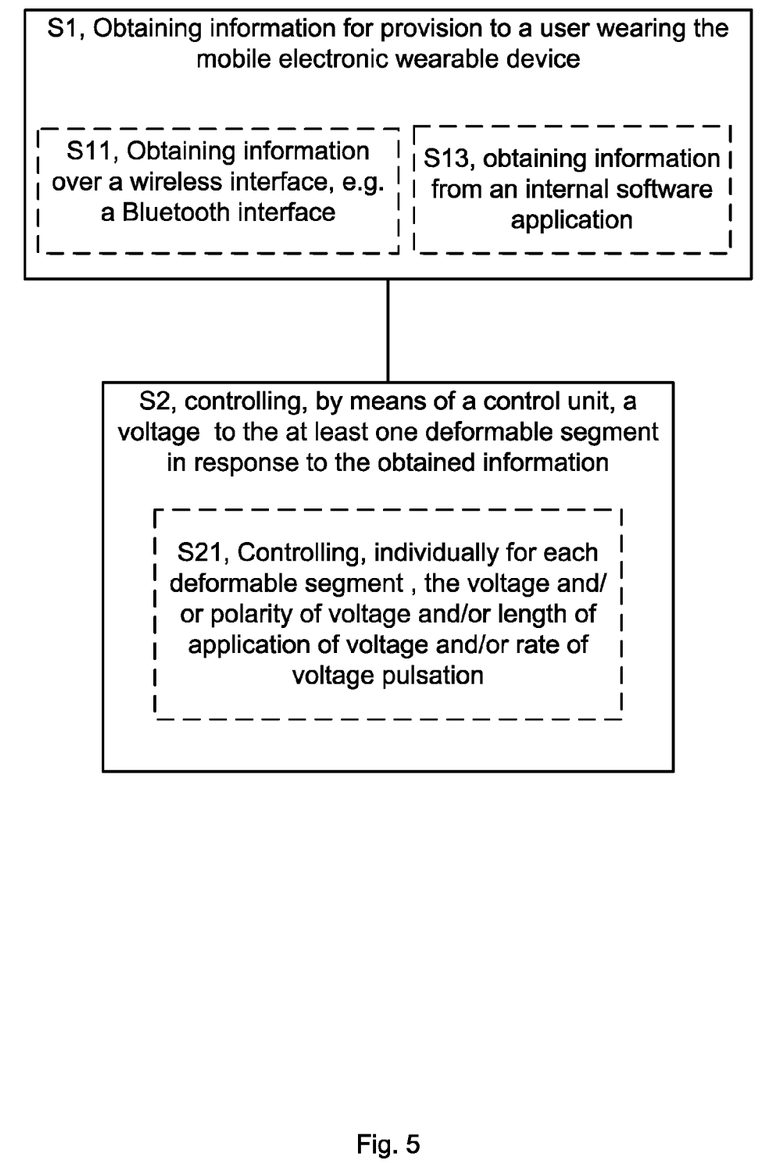
FIG. 5 illustrates a flowchart of a method for providing haptic notifications on mobile electronic wearable devices.

FIG. 5 illustrates a flowchart of a method for providing haptic notifications on mobile electronic wearable devices according to one embodiment of the present invention. The method comprises the steps of:

S1, obtaining information for provision to a user wearing the mobile electronic wearable device 1, and S2, controlling, by means of a control unit 11, a voltage to the at least one deformable segment 12a, 12b in response to the obtained information.

Thereby may the deformation of said at least one deformable segment 12a, 12b be controlled by means of the provided voltage in order to deliver a haptic notification to a user. The haptic notification is delivered by the at least one deformable segment 12a, 12b deforming outwards towards the skin of a user and applying pressure against the skin of the user in a certain way based on the obtained information. The voltage applied to each deformable segment 12a, 12b may be controlled to vary the deformation according to user preference and/or the obtained information in order to notify the user of the mobile electronic wearable device 1 in a varying manner e.g. pulsating, oscillating, or maintaining deformation of each deformable segment.

Thereby may the mobile electronic wearable device 1 deliver a different notification to the user depending on the obtained information and what notification the user want to associate with each type of obtained information. For instance, the user may arrange the mobile electronic wearable device 1 to deliver a pulsating notification by a certain deformable segment 12a, 12b when receiving an SMS and a notification comprising a maintained pressure for a certain time on a certain deformable segment 12a, 12b when receiving an MMS.

The method may further comprise step S11, wherein the obtained information is received over a wireless interface, e.g. a Bluetooth interface, by means of a wireless transceiver 14 or a wireless Bluetooth/Bluetooth low energy transceiver 15. Obtaining information over a wireless or a Bluetooth interface is known in the art and will not be elaborated further in the present disclosure.

Furthermore, the information that the user of the mobile electronic wearable device 1 is to be notified of may be obtained as output from an internal software application running on the mobile electronic wearable device. For instance, the mobile electronic wearable device may comprise an alarm application that generates information when the alarm is sounded indicating that the control unit 11 is to apply a voltage to one or several deformable segment(s) and thereby notify the user of the mobile electronic wearable device 1 that the alarm is sounding.

The control unit 11 may control the voltage applied to each deformable segment 12a, 12b in order to adapt the amount of deformation i.e. protrusion from the surrounding surface and thereby control the amount of pressure that is provided to the skin of the user. Furthermore, by the control unit 11 being adapted to switch the polarity of the applied voltage, the deformation can be reset to a non deformed state rapidly and the deformable segments 12a, 12b can be oscillated at a preferred pace. The length of application of voltage and/or rate of voltage pulsation may further be adapted for each deformable segment 12a, 12b individually. By adapting one or several of these properties of the applied voltage, a great number of different notifications may be provided to the user and the amount of possible notifications is increased for every added deformable segment 12a, 12b. For instance, the deformable segment 12a, 12b may be configured to "tap" against the skin of a user two times at a specific interval when the control unit 11 in the mobile electronic wearable device 1 obtains information that the alarm is sounding.

The information obtained by the mobile electronic wearable device may be signals being transmitted from a mobile electronic device 2 and being indicative of the mobile electronic device 2 receiving any of a SMS, an MMS, a phone call, email, social media update, software update, GPS-navigations, or similar information that may be notified to the user of the mobile electronic wearable device 1. The control unit 11 in the wearable device 1 recognizes the type of information that is obtained and providing the appropriate voltage or sequence of voltage applications to each deformable segment 12a, 12b to deliver a notification that can be detected by the user of the mobile electronic wearable device 1.

The invention claimed is:

1. A mobile electronic wearable device, adapted to be worn by a user, comprising:
   a housing comprising a surface, wherein the surface faces skin of the user when the electronic wearable device is worn;
   an electroactive polymer film comprising at least one deformable segment, the electroactive polymer film applied to a portion of the surface between the surface of the device and the skin of the user; and
   a control unit configured to control a voltage applied over the at least one deformable segment of the electroactive polymer film;
   wherein, when the voltage is applied over the at least one deformable segment, the at least one deformable segment deforms and protrudes towards the skin of the user and applies a pressure against the skin of the user.

2. The mobile electronic wearable device according to claim 1, wherein the mobile electronic wearable device further comprises a wireless transceiver adapted to receive and transmit wireless signals and wherein the control unit is adapted to control the voltage based on information obtained over the wireless interface.

3. The mobile electronic wearable device according to claim 2, further comprising a wireless Bluetooth transceiver adapted to communicate wirelessly using Bluetooth, Bluetooth low energy or therewith compatible protocols.

4. The mobile electronic wearable device according to claim 2, wherein the wireless transceiver is adapted to receive wireless signals comprising notification information from a mobile electronic device, the notification information being indicative of the mobile electronic device receiving any of a SMS, an MMS, a phone call, email, social media update, software update, GPS-navigation instructions, or similar information.

5. The mobile electronic wearable device according to claim 2, wherein the control unit is adapted to control the voltage that is applied over the at least one deformable segment in response to output from an internal software application running on the mobile electronic wearable device.

6. The mobile electronic wearable device according to claim 2, wherein the mobile electronic wearable device is configured to be worn on the wrist.

7. The mobile electronic wearable device according to claim 2, wherein the electroactive polymer film has a thickness in the range of 0.2-1.5 mm, preferably in the range 0.5-to 1.0 mm.

8. The mobile electronic wearable device according to claim 2, wherein the at least one deformable segment has an essentially circular outline.

9. The mobile electronic wearable device according to claim 2, wherein the at least one deformable segment has a size in the range of 3-20 mm, preferably in the range of 5-10 mm.

10. The mobile electronic wearable device according to claim 2, wherein the electroactive polymer film comprises two deformable segments,
    wherein the deformations of each deformable segment are individually controllable by the control unit, and
    wherein the control unit applies a predefined pattern of voltages across the two deformable segments when the information obtained over the wireless interface is a predefined type of information to indicate the type of information to the user in a manner distinguishable from other applications of pressure by the deformable segments against the skin of the user.

11. A method for providing haptic notifications to a user of a mobile electronic wearable device comprising:
    obtaining information for provision to a user wearing the mobile electronic wearable device, wherein the mobile electronic wearable device comprises:
      a housing comprising a surface, wherein the surface faces skin of the user when the electronic wearable device is worn, and
      an electroactive polymer film comprising at least one deformable segment, and applied to the surface such that, when the electronic wearable device is worn by the user, the electroactive polymer film is positioned between the surface and the skin of the user; and
    applying, by means of a control unit, a voltage over the at least one deformable segment in response to the obtained information, wherein, when the voltage is applied over the at least one deformable segment, the at least one deformable segment protrudes towards the skin of a user, thereby applying a pressure against the skin of the user.

12. The method according to claim 11, wherein the obtained information is received over a wireless interface by means of a wireless transceiver.

13. The method according to claim 12, wherein the obtained information may be received over a wireless Bluetooth interface by means of a wireless Bluetooth transceiver and/or a wireless Bluetooth low energy transceiver.

14. The method according to claim 11, wherein the obtained information is output from an internal software application running on the mobile electronic wearable device.

15. The method according to claim 14, wherein the control unit controls, for each deformable segment individually, at least one of the voltage, polarity of voltage, length of application of voltage, or rate of voltage pulsation based on the obtained information.

16. The method according to claim 13, wherein the voltage is controlled in response to information obtained over the wireless interface, the signals being transmitted from a mobile electronic device and being indicative of the mobile electronic device receiving any of an SMS, an MMS, a phone call, email, social media update, software update, or GPS navigation.

17. A system, comprising:
a mobile electronic wearable device, adapted to be worn by a user, comprising:
  a housing comprising a surface, wherein the surface faces skin of the user when the electronic wearable device is worn;
  an electroactive polymer film comprising at least one deformable segment, and applied to a portion of the surface such that, when the electronic wearable device is worn by the user, the electroactive polymer film is positioned between the skin of the user and the surface of the device;
  a control unit configured to apply a voltage over the at least one deformable segment of the electroactive polymer film, wherein, when the voltage is applied over the at least one deformable segment, the at least one deformable segment deforms such that the at least one deformable segment protrudes towards the skin of the user and applies a pressure against the skin of the user; and
a mobile electronic device, comprising a wireless communication interface, wherein the mobile electronic device is configured to transmit information, using the wireless interface, to the control unit of the mobile electronic wearable device, and wherein the control unit applies the voltage based on the transmitted information.

18. The system of claim 17, wherein the mobile electronic wearable device further comprises a wireless transceiver adapted to receive and transmit wireless signals and wherein the control unit is adapted to apply the voltage based on information obtained over the wireless interface.

19. The system of claim 18, wherein the wireless transceiver of the mobile electronic wearable device is adapted to receive wireless signals comprising notification information from a mobile electronic device,
  wherein the control unit in the mobile electronic wearable device is adapted to apply the voltage that is provided to the at least one deformable segment in response to output from an internal software application running on the mobile electronic wearable device,
  wherein the at least one deformable segment of the mobile electronic wearable device is deformable such that it protrudes outwards away from the surface of the mobile electronic wearable device when the voltage is applied and thereby presses in contact with and against the skin of the user, and
  wherein the mobile electronic wearable device comprises two deformable segments which deformations are individually controllable by the control unit.

20. The mobile electronic wearable device according to claim 10, wherein the predefined pattern of voltages includes at least one of:
  voltage applied to one or both deformable segments at a predefined level;
  voltage applied to one or both deformable segments at a predefined polarity;
  voltage applied to one or both deformable segments over a predefined length of time; or
  voltage applied and to one or both deformable segments at a predefined rate of pulsation.

* * * * *